March 24, 1970

W. F. BALDWIN 3,503,038

LOGGING SYSTEM AND METHOD

Filed Sept. 6, 1968

INVENTOR.
Willett F. Baldwin
BY
Arthur F. Zobal
ATTORNEY

March 24, 1970  W. F. BALDWIN  3,503,038
LOGGING SYSTEM AND METHOD
Filed Sept. 6, 1968  3 Sheets-Sheet 2

INVENTOR.
Willett F. Baldwin
BY
Arthur F. Zobal
ATTORNEY

United States Patent Office 3,503,038
Patented Mar. 24, 1970

3,503,038
LOGGING SYSTEM AND METHOD
Willett F. Baldwin, Dallas, Tex., assignor to Mobil Oil Corporation, a corporation of New York
Filed Sept. 6, 1968, Ser. No. 757,971
Int. Cl. G01v 1/26, 1/30, 1/40
U.S. Cl. 340—15.5
4 Claims

ABSTRACT OF THE DISCLOSURE

The specification discloses a logging system including a borehole tool having a rotating acoustic transducer periodically operated to transmit acoustic pulses to the borehole wall for detection of reflected energy. A charging capacitor coupled between first and second switches, the latter of which is coupled to an integrating circuit, is provided to measure the time, and hence distance, between transmission and reception of reflected acoustic energy. The charge formed across the capacitor during each period is integrated and recorded as a continuous trace in correlation with depth. In one embodiment, orientation signals produced during each rotational cycle of the transducer are recorded to give additional information about borehole configuration or tool offset relative to the hole.

Background of the invention

This invention relates to an acoustic well logging system for obtaining a measure of borehole diameter and information about borehole configuration and tool offset.

In United States Patent No. 3,369,626 there is disclosed an acoustic borehole logging technique and system wherein the walls of the borehole are scanned periodically with acoustic energy for obtaining information of interest. In one embodiment, a single transducer which acts both as a transmitter and receiver is rotated in the borehole and periodically actuated to produce acoustic pulses which are applied to the borehole wall. Reflected energy is detected by the transducer between acoustic pulses and converted into signals which are employed to intensity modulate the electron beam of an oscilloscope which is swept across the screen of the scope once for each rotation of the transducer. A downhole orientation sensing means, rotated with the transducer, produces an orienting signal each time the transducer is rotated past magnetic north. These signals initiate the sweep of the electron beam whereby each trace starts at magnetic north. Successive traces are produced representative of the borehole wall characteristics sensed by the rotating transducer. Each successive trace is photographed by suitable means for the production of a two-dimensional, flat record of the inside surface of the borehole wall. These records are very useful in locating and orienting fractures in the borehole walls.

For interpretation purposes it is desirable to know the diameter of the borehole as well as the borehole configuration, tool offset, if any, the orientation of tool offset, and the orientation of prominent features of the borehole configuration if it varies from a circular configuration.

Summary of the invention

In accordance with the present invention, there is provided, in a logging system having a rotating acoustic transducing means which is periodically pulsed, a novel system and technique for obtaining such information. In accordance with one aspect, there are produced sync pulses coincident with the generation of each acoustic pulse. From the sync pulses and the acoustic pulses detected, there is generated a function representative of the distance between the point of transmission and the surface from which the acoustic energy is reflected. This function is recorded as a continuous trace in correlation with the depth of the acoustic transducing means. There is also produced, in one embodiment, an orientation signal each time the transducing means rotates past a predetermined geographic orientation. These orientation signals are recorded in conjunction with the recordation of the continuous trace for indicating the orientation of borehole configuration features or tool offset.

In accordance with the embodiment disclosed, the borehole diameter and configuration measuring means comprises an integrating means, a capacitor means, and first and second control means coupled to the capacitor means. The second control means is coupled between the capacitor means and the integrating means. The sync signals are applied to the first control means to allow the capacitor means to discharge by way of the first control means at the beginning of each period of operation. This capacitor means then is allowed to charge until reception of the receiver signal. This signal is applied to the second control means to allow the charge formed across the capacitor at the occurrence of the receiver signal, following a sync pulse, to discharge by way of the second control means to the integrating means. The output of the integrating means is coupled to a recorder which records a continuous trace in correlation with the depth of the transducing means.

In the embodiment disclosed, the first and second control means are switches which are closed, respectively, by the sync and receiver signals to allow discharge of the capacitor.

Description of the well logging system

Figure 1:
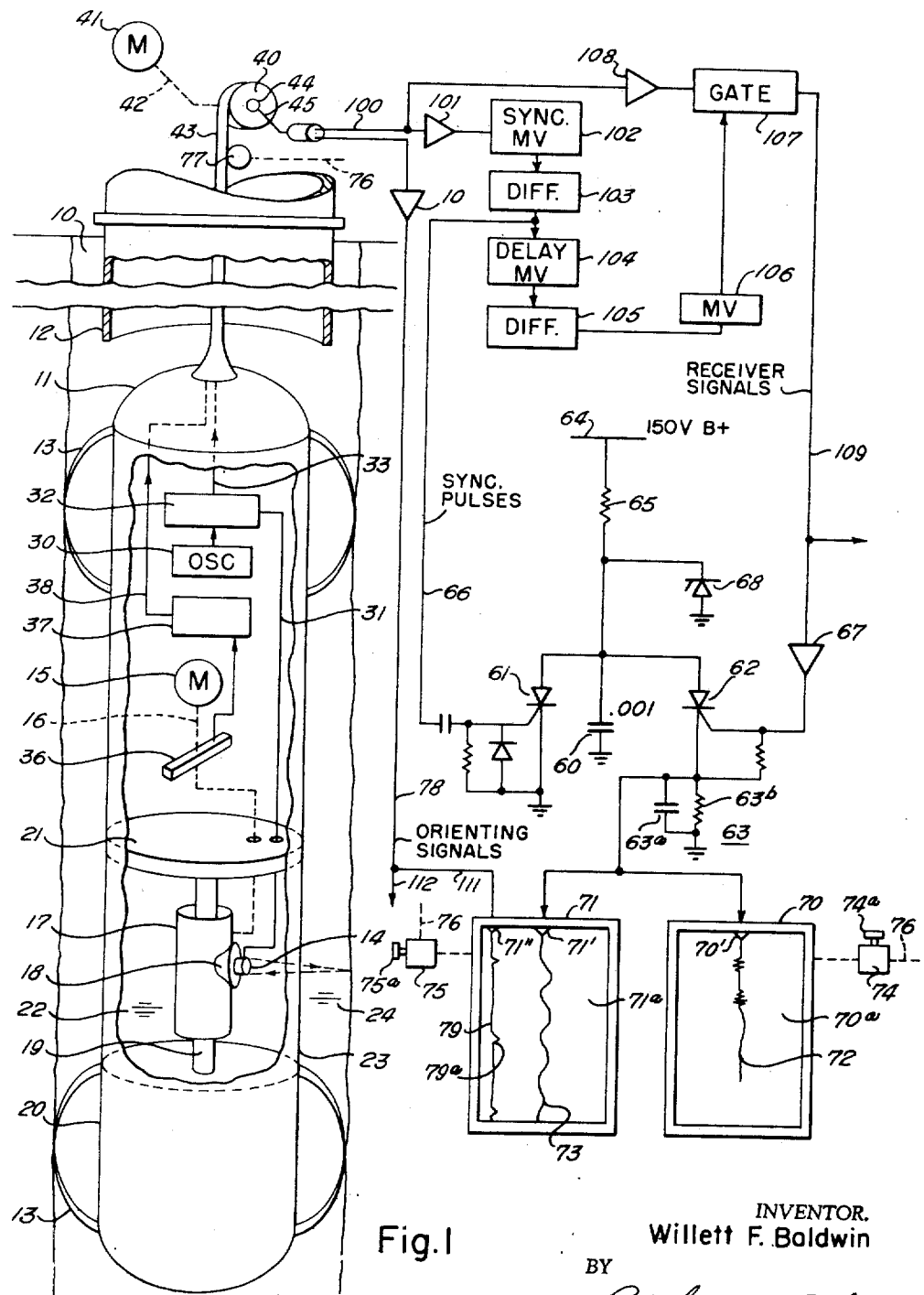
FIGURE 1 illustrates the present invention as employed in combination with an acoustic well logging system.

Referring now to FIGURE 1, there will be described briefly the borehole logging system employed for carrying out logging operations in a borehole illustrated at 10. The borehole system comprises a slim hole tool 11 employed in production logging and having a diameter small enough to pass through production tubing illustrated at 12. Flexible metal straps 13 are provided for centralizing the tool 11 in the borehole. This tool has located therein an acoustic transducer 14 which acts as a transmitter and receiver of acoustic energy. During logging operations, the transducer 14 is rotated through 360° at a rate of about one revolution per second by motor 15, mechanical drive 16 (illustrated in detail in U.S. Patent No. 3,378,097), sleeve 17, and transducer mount 18. The sleeve 17 rotates about mandrel 19 which connects end member 20 to structure 21. During each 360° cycle, the transducer 14 is pulsed periodically at a repetition rate of about 1400 pulses per second for the application of acoustic pulses to the borehole wall by way of tool fluid 22, rubber boot 23, and borehole fluid 24. Oscillator 30 periodically triggers a transmitter circuit incorporated in circuitry 32 which is coupled to the transducer 14 by way of conductor 31 and slip rings (not shown). The transmitter circuit thus periodically actuates the transducer for the production of acoustic pulses. Between transmitted acoustic pulses, reflected energy is detected by the transducer 14 and applied to the surface by way of conductor 31, gating and amplifying devices also incorporated in circuitry 32, and cable conductor 33. Sync pulses are obtained from the transmitter circuitry and are applied to the conductor 33 for transmission to the surface.

Also coupled to the mechanical drive 16 for rotation therewith is a magnetic north sensing means 36 which may be a Hall-effect device or a fluxgate magnetometer. This sensing means is coupled to circuitry 37 which produces an orienting signal each time the transducer 14 passes magnetic north. The orienting signal is applied to cable conductor 38 for transmission to the surface.

During logging operations, drum 40, driven by motor 41 and mechanical connection 42, winds and unwinds the supporting cable 43 to move the tool 11 continuously through the borehole. At the surface, the various pulses and signals are taken from the cable conductors by way of slip rings and brushes illustrated, respectively, at 44 and 45.

Figure 2:
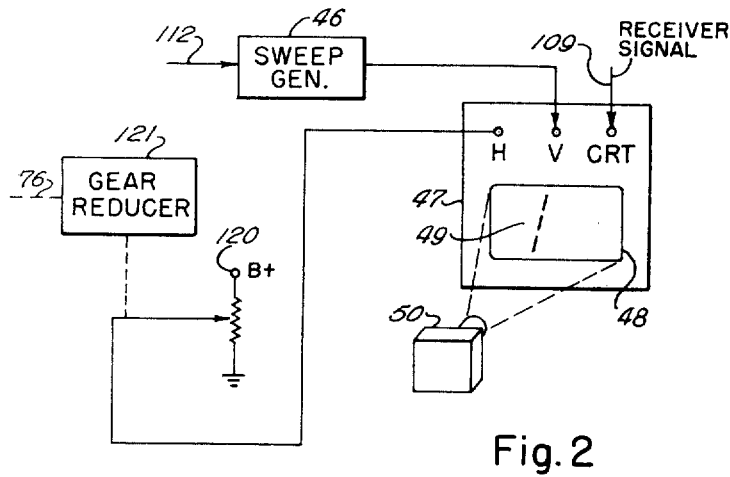
FIGURE 2 illustrates an uphole recording system.

Referring to FIGURE 2, the orienting signals are applied to trigger a sawtooth wave generator 46, the output of which is applied to the vertical deflection plate of an oscilloscope 47. These orienting signals thus initiate the sweep of the electron beam of the cathode-ray tube of the oscilloscope when it is ON. The output signals of the transducer 14 are applied to the Z-axis input or to the cathode of the cathode-ray tube of the oscilloscope to intensity modulate the electron beam and turn it ON at a high repetition rate as it sweeps vertically across the screen 48. Thus, during each rotational cycle of the transducer 14, there is produced across the screen 48 of the oscilloscope 47 an illuminating trace illustrated at 49. Successive traces are stepped horizontally with depth and photographed by a camera 50 for the production of a two-dimensional print or display of successive traces and which display represents a folded-out section of the inside of the borehole wall.

Description of the preferred embodiments

In accordance with the present invention, a novel and simple arrangement is provided for continuously measuring the average diameter of the borehole as well as the distance from the transducer to the borehole at various angular positions as the transducer rotates. This latter measurement allows one to determine the shape of the borehole as well as to determine whether the tool is centralized or decentralized in the borehole. By producing transducer orientation signals during each cycle and recording these signals in conjunction with the detailed transducer-to-borehole-wall-spacing measurements, one may gain information, for example, about the direction in which the borehole cross section varies from a circular configuration. All of this information is desirable in the interpretation of the folded-out section record of the borehole wall.

Referring again to FIGURE 1, the borehole diameter and configuration measuring system comprises a capacitor 60 coupled to two switches 61 and 62, the latter of which is coupled to integrator 63 comprising capacitor 63a and resistor 63b. Switches 61 and 62 are illustrated as silicon-controlled rectifiers biased to be normally OFF. Capacitor 60 is charged from 150-volt, B+ conductor 64 by way of resistor 65. At the beginning of each pulsing operation or cycle, sync pulses are applied by way of conductor 66 to turn the silicon-controlled rectifier 61 ON, thereby momentarily discharging the capacitor 60 through rectifier 61. When the potential at the anode of rectifier 61 decreases below a certain level, following discharge of capacitor 60, it turns OFF. Thus, at the beginning of each pulsing operation or cycle, capacitor 60 is discharged but then is charged from B+. The charge formed across capacitor 60 is dependent upon the time, and hence distance, required for the reflected energy to be detected by transducer 14 following the production of a sync pulse. In this respect, the receiver signal produced by transducer 14 upon the detection of reflected energy is applied by high-gain amplifier 67 to silicon-controlled rectifier 62 to momentarily turn this rectifier ON and allow the charge across capacitor 60 to discharge through rectifier 62 to the integrating circuit 63. Zener diode 68 limits the voltage formed across capacitor 60 to a desirable maximum, for example, 40 volts. After discharge of capacitor 60, rectifier 62 turns OFF whereby capacitor 60 charges again and the cycle is repeated. The charge formed across the integrator 63 during each cycle is dependent upon the time occurring between the transmission of acoustic pulses and the reception of reflected energy by the transducer 14. Thus, this charge is related to the distance between the transducer 14 and the borehole wall.

The voltage formed across the integrator 63 is applied to recorders 70 and 71 whereby pens 70' and 71' record on charts 70a and 71a, traces 72 and 73, respectively, which give the desired information. The charts 70a and 71a of these recorders, respectively, are driven at different speeds in correlation with depth of the tool 11. The arrangement for driving the charts 70a and 71a includes gear assemblies 74 and 75, mechanical connections 76, and reel 77, the latter of which is driven by cable 43.

In carrying out logging operations, a suitable logging speed for the tool 11 is about twenty feet per minute. By selecting the appropriate time constant for the integrator 63, as well as the values of capacitor 60 and resistor 65, and by suitably adjusting the speed at which the charts 70a and 71a of the recorder 70 and 71 are driven by the cable 43, one may obtain a measure either of the average time between the transmission and reception of reflected energy during one revolution of the transducer 14 or a detailed measure of the distance between the transducer 14 and the borehole wall as the transducer sweeps around the borehole wall during one revolution. For example, suitable values for capacitors 60 and 63a are 0.001 mfd. and 1.0 mfd., respectively, while suitable values for resistors 65 and 63b are 1 megohm and 15,000 ohms, respectively. By adjusting control 74a of gear assembly 74 to drive the chart 70a at a rate of one inch per twenty feet of travel of tool 11, the trace 72 obtained will reflect the average time or distance between the transducer and the borehole wall during one revolution of the transducer. By employing the same values for capacitors 60 and 63a and resistors 65 and 63b and by adjusting control 75a of gear assembly 75 to drive the chart 71a of recorder 71 at a faster rate, for example, at a rate of ten inches per twenty feet of travel of tool 11, the trace 73 obtained will reflect in detail the time, and hence distance, between the transducer 14 and the borehole wall as it sweeps around the borehole wall. Moreover, by employing the orientation signals from conductor 78 to actuate a spring-biased relay (not shown) which in turn actuates an event marker 71" of the recorder 71, there is recorded trace 79 having excursions 79a which occur once during each revolution of the transducer 14 and are indicative of magnetic north. Thus, trace 73 reflects the borehole configuration or tool offset, while trace 79 will give an indication of the direction of tool offset or the orientation of prominent features of the borehole configuration if it varies from a circular configuration.

The information obtained by the three traces is particularly useful in interpreting the folded-out section records obtained with the slim hole tool 11. This tool has a small diameter, i.e., 1¾ inches O.D., and hence is very sensitive to borehole size and configuration variations and moreover tends to become more easily decentralized than a tool of larger diameter.

Figure 4:
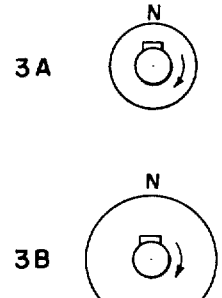
FIGURES 4 and 5 illustrate traces useful in understanding the invention.
Figure 4:
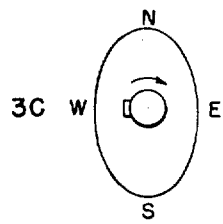
Figure 4:
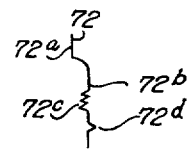
Figure 3:
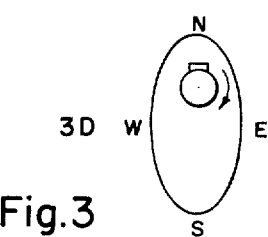
FIGURES 3A–3D illustrate borehole configurations and situations of interest.
Figure 5:
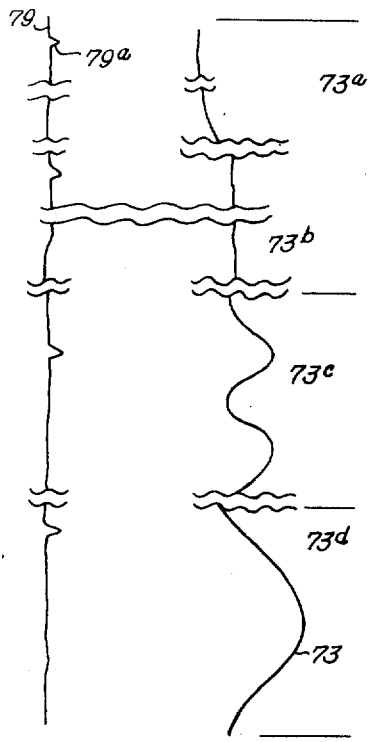

Referring to FIGURES 3A–3D, 4 and 5, four situations will be described wherein the traces 72, 73, and 79 may be employed to obtain useful information. On traces 72 and 73, time and hence distance increase from left to right. In FIGURES 3A and 3B, the tool 11 is centrally located within the borehole whose diameter increases from that shown in FIGURE 3A to that shown in FIGURE 3B. In FIGURE 3C, the tool is centrally located in the borehole whose cross section is elliptical in shape, while in FIGURE 3D the tool has become decentralized in the elliptically shaped borehole. The situations of FIGURES 3A–3D are depicted, respectively, by sections 72a–72d of trace 72, as shown in FIGURE 4, and by sections 73a–73d, respectively, of trace 73, as shown in FIGURE 5. Since trace 72 is compressed with respect to trace 73, it allows the operator to determine at a quick glance whether the diameter of the borehole has changed. Information about the average diameter of the borehole has value with respect to the folded-out section records obtained since it allows one to account, for example, to a general change in amplitude of the reflected signal. For example, an over-all decrease in the amplitude of the reflected signal may be due to an increase in diameter.

Trace 73 is useful since it will show in more detail than trace 72 changes in borehole configuration or possible decentralization of the tool. As can be seen in FIGURE 5, section 73c is clearly different from section 73d and hence allows one to distinguish between the situations of FIGURES 3C and 3D. This information is desirable in connection with the folded-out sections produced since it allows one to determine why, for example, the reflected signal has decreased in amplitude in certain directions. Since the traces 49 of FIGURE 2 start with magnetic north, it is desirable to tie in direction with the excursions of trace 73. This is done by the excursions 79a of trace 79 which indicate the positions of magnetic north on trace 73 during each cycle of the transducer 14.

Figure 6:
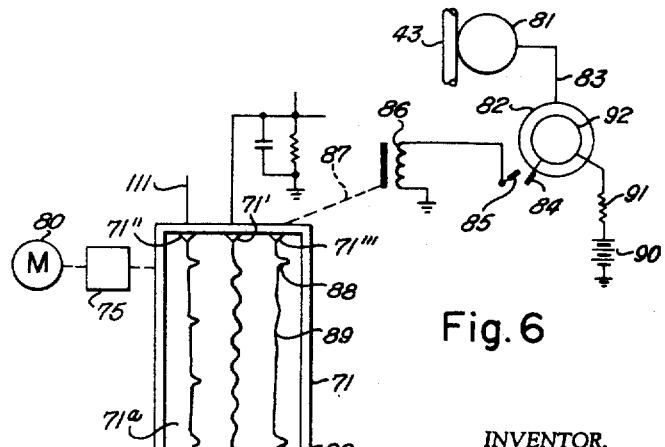
FIGURE 6 illustrates a modification of the present invention.

In the system of FIGURE 1, the charts of the recorders were disclosed as driven in correlation with depth of the tool by the reel 77 and mechanical connection 76. As an alternative, the charts may be driven at a constant speed from an independent power drive and depth indications recorded on the chart. For example, referring to FIGURE 6, a constant speed motor 80 is shown coupled to gear reducer 75 for driving the chart 71a of recorder 71 at a constant speed. A Selsyn generator 81 is driven by the cable 43 through a system of rollers and gears. This generator is coupled to a Selsyn follower 82 by way of electrical connections illustrated at 83 and drives the Selsyn follower at a predetermined rate, for example, at a rate of one revolution per foot of movement of the cable 43. Terminal 84 coupled to follower 82 contacts terminal 85 once for each revolution of the follower 82 whereby spring-biased relay 86 is actuated once for each foot of travel of cable 43. Actuation of spring-biased relay 86 in turn actuates, by way of mechanical connection 87, a second event marker 71''' to record an excursion 88 on trace 89 for each foot of travel of the tool 11. Flow of current through the coil of relay 86 when terminals 84 and 85 contact each other is by way of battery 90, resistor 91, slip ring 92, terminals 84–85, the coil of relay 86 and ground.

Now that the invention has been described, other details of the system will be explained. As indicated previously, the receiver pulses and sync pulses are applied to cable conductor 33, FIGURE 1, for application to the surface. At the surface, these pulses are applied to conductor 100 and are separated as follows. The sync pulses are amplified by amplifier 101 and applied to a sync multivibrator 102. This multivibrator produces a square-wave pulse of a relatively long duration which prevents spurious signals or receiver signals from coming through during the time of its production. This square wave is differentiated at 103. The pulse formed from the leading edge of the square wave is applied to conductor 66 to close SCR 61 and also is applied to trigger a delay multivibrator 104. Its square-wave output is differentiated at 105 and the pulse formed from the trailing edge of the square-wave output from multivibrator 104 is applied to trigger a gating multivibrator 106. This multivibrator produces a square-wave pulse which occurs when the receiver signal is expected. This square-wave pulse is applied to open the gate 107 whereby the receiver signals, amplified at 108, pass through the gate 107 to conductor 109. From conductor 109, the receiver signals pass to amplifier 67 and also to the cathode-ray tube of the oscilloscope 47, shown in FIGURE 2. Amplifier 67 is operated in a state of saturation in order to allow the small-amplitude signals as well as the large-amplitude signals to close rectifier 62.

As indicated previously, in the tool 11 the orienting signals are applied to cable conductors 38 for transmission to the surface. At the surface, these signals are amplified at 110 and applied to cable conductor 78. From conductor 78 they are applied to recorder 71 by way of conductor 111 and also to the sweep generator 46 (FIGURE 2) by way of conductor 112.

Referring to FIGURE 2, the system for stepping the traces horizontally comprises a potentiometer 120, the arm of which is mechanically coupled through a gear reducer 121 to the mechanical connection 76 driven by reel 77, shown in FIGURE 1. As the cable 43 is moved continuously to move the tool 11 through the borehole, the contact of the potentiometer 120 moves across the resistive element, thereby generating a slowly changing sweep voltage which is applied to the horizontal deflection plate of the oscilloscope 47. The oblique trace indicates the continuous change in depth of the logging tool. Each trace will begin at a horizontal position substantially where the preceding trace terminated.

In the embodiment disclosed, the oscilloscope 47 has a screen 48 with more available space in the horizontal direction. In order to obtain more pictures per depth with the same resolution, the system is arranged to sweep the traces 49 vertically across the screen 48. It is to be understood, however, that the traces 49 may be swept horizontally across the screen 48 by applying the output of sweep generator 46 to the horizontal deflection plate and the output of potentiometer 120 to the vertical deflection plate of the oscilloscope 47.

Figure 7:
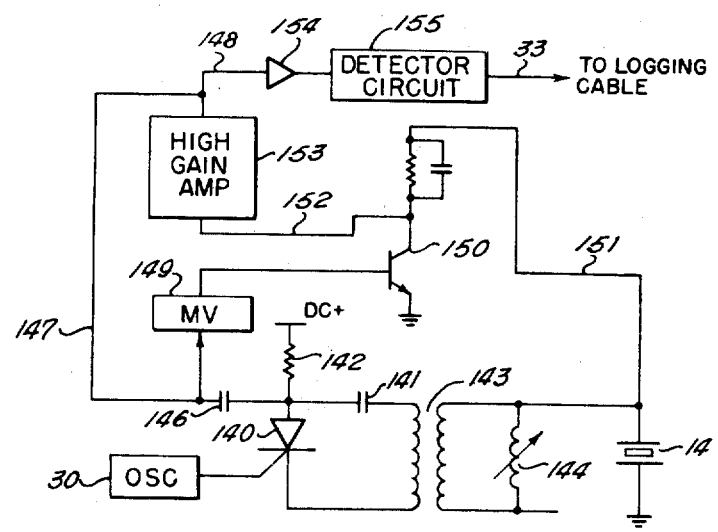
FIGURES 7 and 8 illustrate in detail certain components of the well logging system.

Referring to FIGURE 7, there will be described the borehole pulsing and sync signal producing system. The pulsing system comprises oscillator 30, silicon-controlled rectifier 140, and capacitor 141, the latter of which is charged from B+ by way of resistor 142. Each pulse from oscillator 30 causes silicon-controlled rectifier 140 to conduct, thereby allowing capacitor 141 to discharge. The voltage generated by the discharge of capacitor 141 is coupled through transformer 143 to excite the transducer 14 to generate an acoustic pulse. The tuning coil 144 is employed to allow adjustment to obtain the desired frequency.

A portion of the discharge of capacitor 141 passes through the small capacitor 146 for the production of a sync pulse of relatively small amplitude. This sync pulse is applied by way of conductor 147 to conductor 148. It also triggers multivibrator 149 for the production of a pulse having a width which substantially coincides with the expected output produced by the transducer 14 when transmitting. This pulse is applied to the base of transistor 150 to cause this transistor to conduct. Normally, it is biased to cutoff. Thus, during the transmission of the transducer 14, the output thereof is applied by way of conductor 151 to the transistor 150 where it passes through transistor 150 to ground. Thus, transistor 150 acts as a gate to effectively block the output from the transducer 14 while it is transmitting. Following the production of a pulse by multivibrator 149, the transistor 150 becomes nonconductive and the transducer output produced upon the reception of reflected energy passes from conductor 151 to conductor 152 and then to high-gain amplifier 153. The output from amplifier 153 is applied to conductor 148 where the sync pulses and the receiver pulses are amplified at 154 and applied to detector circuit 155. This circuit produces the envelope of the received signal, as well as the envelope of the sync pulse, which is applied to the cable conductor 33.

Figure 8:
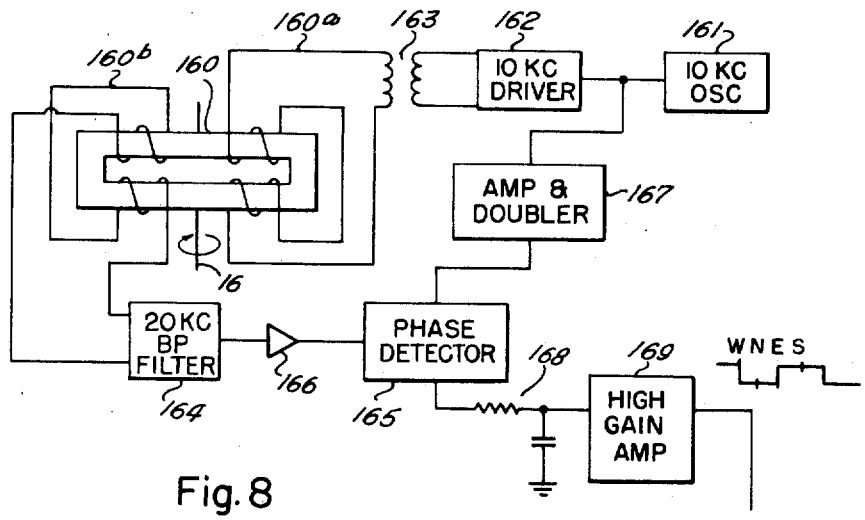

As disclosed in the above-mentioned U.S. Patent No. 3,369,626, the magnetic north sensing means 36 may be a Hall-effect device displaced 90° with respect to the transducer 14 whereby an orienting pulse is produced with the Hall-effect device pointing west and with the transducer 14 pointing north. Instead of a Hall-effect device, a fluxgate magnetometer may be employed for the magnetic north sensing means 36. Such a system is disclosed in FIGURE 8. The magnetometer consists of a core 160 formed of magnetic material which is rotated by the mechanical drive 16, also shown in FIGURE 1. This core is excited by circuitry comprising a 10-kc. pulse generator 161, a driving circuit 162, and a transformer 163 coupled to winding 160a. The output from the core winding 160b is applied to a 20-kc. bandpass filter 164, the output of which is coupled to a phase detector 165 by way of amplifier 166. The 10-kc. signal produced from generator 161 is applied to an amplifier and doubler 167 for the production of a 20-kc signal which then is applied to the phase detector 165 for comparison purposes. The output from the phase detector is integrated by integrator 168 to remove the 20-kc. carrier signal and to produce a sine wave having a maximum amplitude when the core 160 is oriented toward magnetic north. The output of the integrator 168 drives the high-gain amplifier 169 to a state of saturation to produce square-wave pulses whose trailing edges are representaive of the westerly direction. These pulses may be differentiated, clipped, and inverted for the production of the orienting signals.

Now that the invention has been described, modifications will become apparent to those skilled in the art and it is intended to cover such modifications as fall within the scope of the appended claims.

What is claimed is:
1. A borehole logging system comprising:
an elongated borehole tool for insertion into a borehole and having an acoustic transducer means for generating acoustic pulses for transmission to the borehole wall and for detecting acoustic energy reflected from said borehole wall,
means for rotating said transducer means about the longitudinal axis of said tool,
means for periodically operating said transducer means to periodically generate acoustic pulses for transmission to said borehole wall,
means for periodically producing sync signals each having a predetermined time relationship with respect to each acoustic pulse generated,
means for producing receiver signals representative of reflected acoustic energy detected during each period of operation,
an integrator,
a capacitor,
first and second control means coupled to said capacitor,
said second control means being coupled between said capacitor and said integrator,
means for applying said sync signals to said first control means to control said first control means to allow said capacitor to discharge by way of said first control means at the beginning of each period of operation,
means for charging said capacitor, and
means for applying said receiver signals to said second control means to control said second control means to allow the charge formed across said capacitor to discharge by way of said second control means to said integrator upon the occurrence of a receiver signal following a sync pulse.
2. The system of claim 1 comprising:
means for recording the output of said integrator as a continuous trace in correlation with the depth of said transducer means.
3. A borehole logging method comprising the steps of:
moving an acoustic transducing means through a borehole, rotating said transducing means about an axis parallel with the axis of said borehole,
periodically operating said transducing means to periodically generate acoustic pulses for transmission to the borehole wall,
detecting acoustic energy reflected from said borehole wall,
periodically producing sync pulses, each having a predetermined time relationship with respect to each acoustic pulse generated,
from said sync pulses and said acoustic pulses detected, generating a function representative of the distance between the point of transmission and the surface from which said acoustic energy is reflected,
recording said function as a continuous trace as said acoustic transducing means is moved through said borehole,
producing an orienting signal each time said transducing means rotates past a predetermined geographic orientation, and
recording each orienting signal in conjunction with the recordation of said trace for indicating orientation for each cycle of rotation of said transducing means.
4. A method of recording data obtained from borehole logging operations wherein:
cyclic scanning operations are carried out angularly around a borehole by periodically generating energy pulses for transmission to reflecting interfaces of interest during each scanning cycle and detecting energy reflected from said interfaces,
reflection signals are produced in response to reflected energy detected,
sync pulses are produced periodically, each having a predetermined time relationship with respect to each energy pulse generated,
an orienting signal is produced each time said scanning operations are angularly moved past a predetermined geographic orientation,
said method comprising the steps of:
in response to said sync pulses and said reflection signals produced, generating a function representative of the distance between the point of generation of said energy pulses and the interfaces from which said energy is reflected,
recording said function as a continuous trace, and
recording each orienting signal in conjunction with the recordation of said trace for indicating orientation for each scanning cycle.

References Cited

UNITED STATES PATENTS 2,631,270  3/1953  Goble _____ 181—0.5 X
2,704,364  3/1955  Summers _____ 181—0.5

RODNEY D. BENNETT, Jr., Primary Examiner

D. C. KAUFMAN, Assistant Examiner

U.S. Cl. X.R.

181—.5; 340—18